(12) United States Patent
Fox et al.

(10) Patent No.: US 10,986,853 B2
(45) Date of Patent: Apr. 27, 2021

(54) RETRACTING FOOD PROCESSING DEVICE IN A FOOD PROCESSING MACHINE

(71) Applicant: PROVISUR TECHNOLOGIES, INC., Chicago, IL (US)

(72) Inventors: Gage A. Fox, Manhattan, IL (US); Glen F. Pryor, Manhattan, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 185 days.

(21) Appl. No.: 15/662,278

(22) Filed: Jul. 27, 2017

(65) Prior Publication Data

US 2018/0092383 A1    Apr. 5, 2018

Related U.S. Application Data

(60) Provisional application No. 62/404,594, filed on Oct. 5, 2016.

(51) Int. Cl.
| | |
|---|---|
| *A23L 3/00* | (2006.01) |
| *B65G 33/06* | (2006.01) |
| *A23L 3/015* | (2006.01) |
| *B26D 5/02* | (2006.01) |
| *A22C 17/00* | (2006.01) |
| *B26D 1/143* | (2006.01) |

(Continued)

(52) U.S. Cl.
CPC .......... *A23L 3/001* (2013.01); *A22C 17/0006* (2013.01); *A22C 17/0033* (2013.01); *A23L 3/0155* (2013.01); *A47J 43/087* (2013.01); *B26D 1/143* (2013.01); *B26D 5/02* (2013.01); *B65G 33/06* (2013.01); *A47J 43/06* (2013.01); *B26D 1/28* (2013.01); *B26D 1/29* (2013.01); *B26D 2210/02* (2013.01); *B26D 2210/08* (2013.01)

(58) Field of Classification Search
CPC .......... B26D 5/02; B26D 5/08; B26D 7/2635; A23L 3/001
See application file for complete search history.

(56) References Cited

U.S. PATENT DOCUMENTS

| | | | |
|---|---|---|---|
| 2,183,258 A | * 12/1939 | Harman | ............... F16H 55/52 474/58 |
| 3,219,080 A | 11/1965 | Buchner | |

(Continued)

FOREIGN PATENT DOCUMENTS

DE    2931970 A1    2/1981

OTHER PUBLICATIONS

International Preliminary Report on Patentability for PCT Application No. PCT/US17/44266 dated Apr. 9, 2019, 7 pages.

(Continued)

*Primary Examiner* — Elizabeth Insler
(74) *Attorney, Agent, or Firm* — Klintworth & Rozenblat IP LLP (57) ABSTRACT

A food processing system includes a driving pulley, a driven pulley, a motor, a belt, and an actuator. The motor is configured to rotate the driving pulley. The belt is connected with the driving pulley and the driven pulley. The driving pulley is configured to rotate the belt. The belt is configured to rotate the driven pulley. The actuator is connected with the driven pulley. The actuator is configured to move the driven pulley relative to the belt between an extended position and a retracted position.

15 Claims, 9 Drawing Sheets

(51) Int. Cl.
*A47J 43/08* (2006.01)
*B26D 1/28* (2006.01)
*A47J 43/06* (2006.01)
*B26D 1/29* (2006.01)

(56) References Cited

U.S. PATENT DOCUMENTS

| | | | |
|---|---|---|---|
| 8,616,103 B2* | 12/2013 | Lindee | A22C 17/0093 83/469 |
| 2008/0250944 A1 | 10/2008 | Pryor et al. | |
| 2011/0179922 A1* | 7/2011 | Weber | B26D 7/2635 83/13 |

OTHER PUBLICATIONS

Notification of Transmittal of the International Search Report and the Written Opinion of the International Search Authority, or the Declaration for PCT/US17/44266, dated Oct. 20, 2017, 9 pages.
Notification of Transmittal of the International Search Report and the Written Opinion of the International Search Authority, or the Declaration for PCT/US17/44266, dated Oct. 2, 2017, 9 pages.
Extended European Search Report issued for European Application No. 17858851.3 dated Dec. 13, 2019, 5 pages.

* cited by examiner

RETRACTING FOOD PROCESSING DEVICE IN A FOOD PROCESSING MACHINE

RELATED APPLICATIONS

This application claims the domestic priority of U.S. Provisional Application Ser. No. 62/404,594, filed on Oct. 5, 2016, the contents of which are incorporated herein in its entirety.

FIELD OF THE DISCLOSURE

This disclosure relates to systems and methods for retracting food processing devices, such as cutting members or other type of food processing devices, in food processing machines.

BACKGROUND

Food processing machines may utilize various food processing devices to process food products. For instance, some food processing machines utilize rotating cutting members to slice food products. Other food processing machines utilize varying food processing devices to form, mold, cut, package, or process food products in differing ways. It can be advantageous to move the food processing devices towards or away from the food products to accomplish the desired objective. Various food processing machines utilize differing systems to achieve this. These systems can be costly and unreliable due to their complexity and the necessity for repairs in addition to taking up a great deal of space. Other such systems may experience one or more additional issues.

A food processing machine and method of its use is needed to overcome one or more of the issues associated with one or more currently used food processing machines to move a food processing device towards and away from a food product.

SUMMARY

In one embodiment of the disclosure, a food processing system is disclosed. The food processing system includes a driving pulley, a driven pulley, a motor, a belt, and an actuator. The motor is configured to rotate the driving pulley. The belt is connected with the driving pulley and the driven pulley. The driving pulley is configured to rotate the belt. The belt is configured to rotate the driven pulley. The actuator is connected with the driven pulley. The actuator is configured to move the driven pulley relative to the belt between an extended position and a retracted position.

In another embodiment of the disclosure, a food processing system is disclosed. The food processing system includes a driving pulley, a driven pulley, a food processing device, a motor, a belt, and an actuator. The food processing device is connected with the driven pulley. The motor is configured to rotate the driving pulley. The belt is connected with the driving pulley and the driven pulley. The driving pulley is configured to rotate the belt. The belt is configured to rotate the driven pulley and the food processing device connected with the driven pulley. The actuator is connected with the driven pulley and the food processing device. The actuator is configured to move the driven pulley and the food processing device connected with the driven pulley relative to the belt between an extended position and a retracted position. The food processing device is disposed further away from the belt in the extended position than in the retracted position.

In an additional embodiment of the disclosure, a method of moving a food processing system is disclosed. In one step, a driving pulley is rotated with a motor. In another step, a belt is rotated with the driving pulley. In still another step, a driven pulley is rotated with the belt. In yet another step, the driven pulley is moved, with an actuator, relative to the belt between an extended position and a retracted position.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
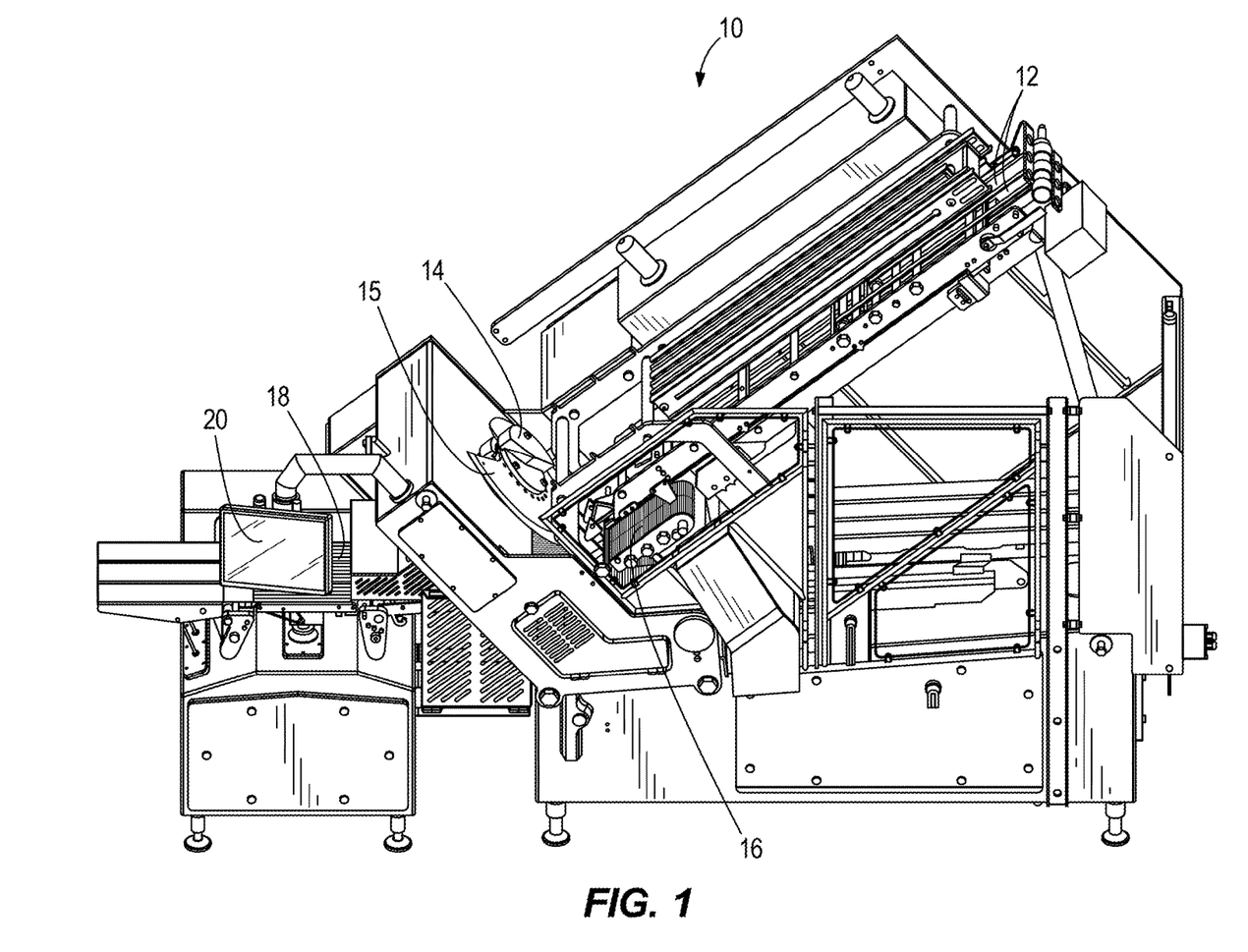
FIG. 1 illustrates a perspective view of one embodiment of a food processing system for processing food products.

FIG. 1 illustrates a perspective view of one embodiment of a food processing system 10 for processing food products. The food processing system 10 includes a track 12, an apparatus 14, conveyors 16 and 18, and a control system 20. Food product is loaded into the track 12 which delivers it to conveyor 16 which delivers it to the apparatus 14. The apparatus 14 comprises a food processing device comprising a cutting member 15 which slices the food product. In other embodiments, the apparatus 14 may vary. The conveyor 18 then carries the sliced food product out of the food processing system 10. The control system 20 controls operation of the food processing system 10. In other embodiments, the food processing system 10 may vary.

Figure 2:
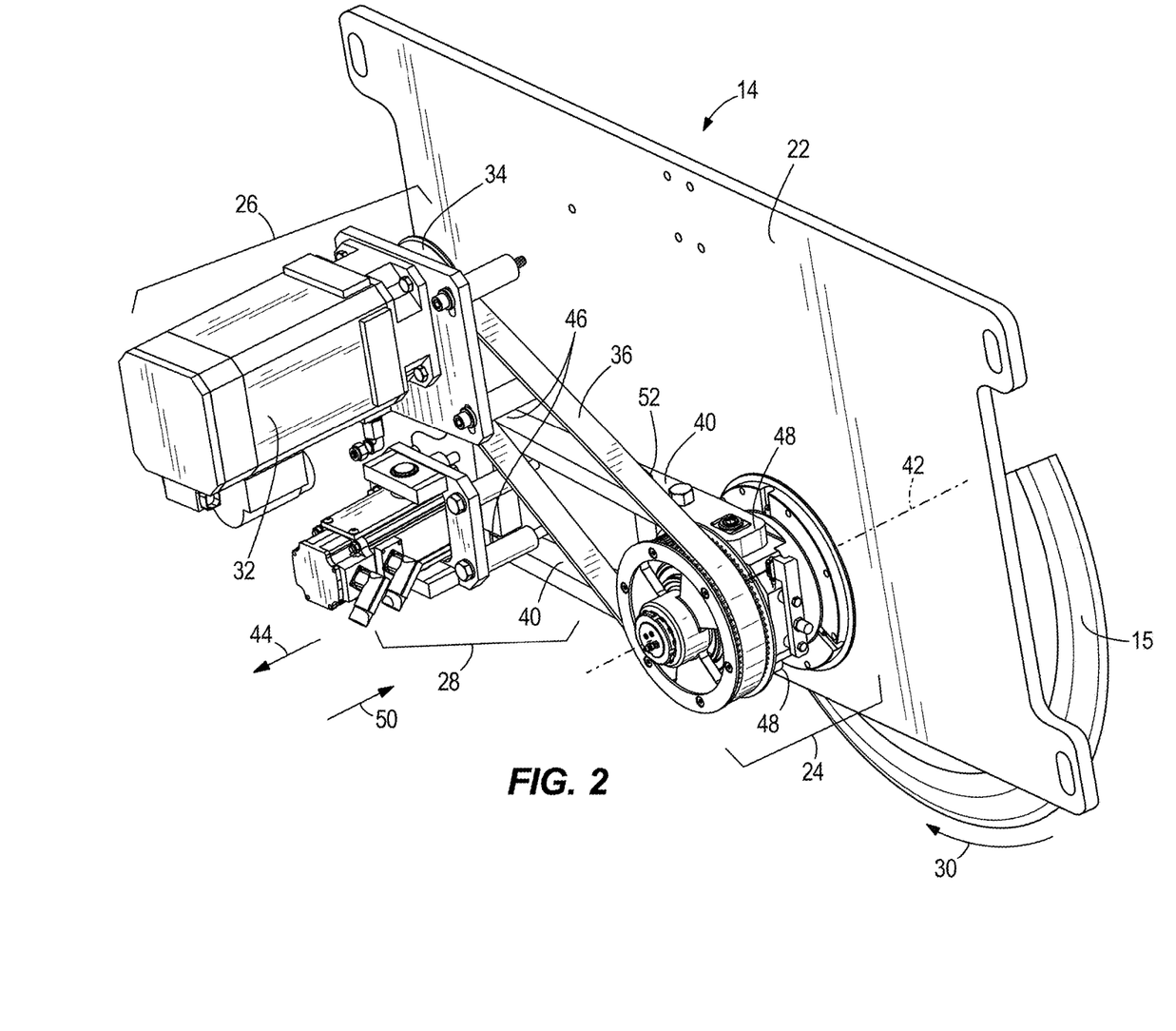
FIG. 2 illustrates a perspective view of an apparatus, and a mounting plate to which the apparatus is attached, removed from the food processing system of the embodiment of FIG. 1.
Figure 3:
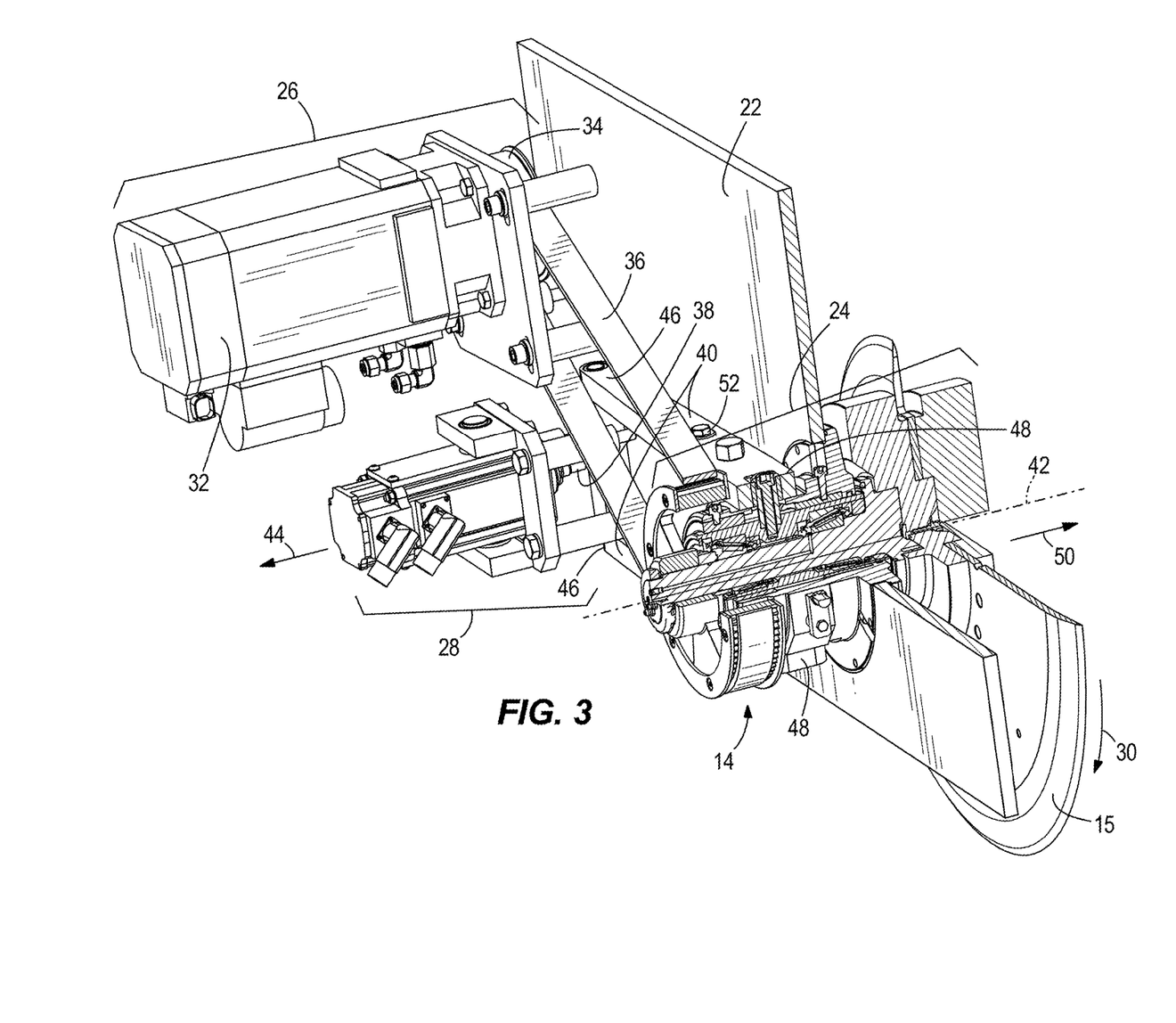
FIG. 3 illustrates the same perspective view of FIG. 2 with a portion of the mounting plate and a portion of a driven system removed to illustrate inner components.
Figure 4:
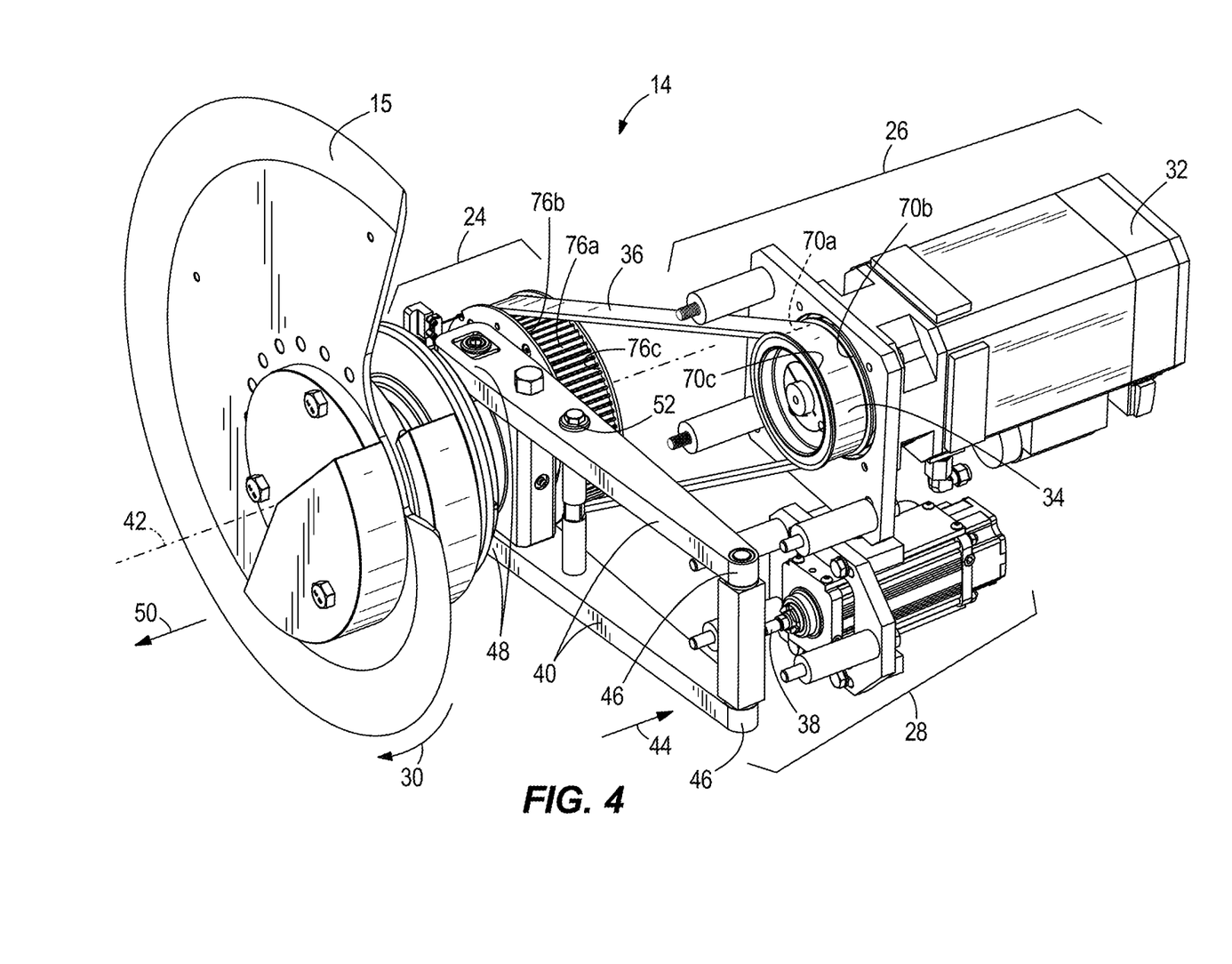
FIG. 4 illustrates an opposite side perspective view as FIG. 2 with the mounting plate removed.

FIG. 2 illustrates a perspective view of the apparatus 14, and a mounting plate 22 to which the apparatus 14 is attached, removed from the food processing system 10 of the embodiment of FIG. 1. FIG. 3 illustrates the same perspective view of FIG. 2 with a portion of the mounting plate 22 and a portion of a driven system 24 removed to illustrate inner components. FIG. 4 illustrates an opposite side perspective view as FIG. 2 with the mounting plate 22 removed.

As shown collectively in FIGS. 2-4, the apparatus 14 includes the cutting member 15, the driven system 24, a driving system 26, and an actuator system 28. The driving system 26 selectively rotates itself, the driven system 24, and the connected cutting member 15 in clockwise direction 30. The driving system 26 comprises a motor 32, a driving pulley 34, and a belt 36. The motor 32 selectively rotates the attached driving pulley 34, which correspondingly rotates the belt 36, which correspondingly rotates the driven system 24, which correspondingly rotates the cutting member 15 all in clockwise direction 30. In such manner, food product may be selectively sliced with the cutting member 15. In other embodiments, the driving system 26 may vary.

The actuator system 28 comprises an actuator shaft 38 (powered by a motor), and actuator arms 40. The actuator system 28 selectively moves the driven system 24 and the connected cutting member 15 between extended and retracted positions along axis 42. When the actuator shaft 38 moves the cutting member 15 in the extended position, the actuator shaft 38 moves in direction 44, thereby causing attached ends 46 of the attached actuator arms 40 to also move in direction 44. This causes ends 48 of the actuator arms 40 to move in direction 50 as a result of the actuator arms 40 pivoting at pivot point 52 which is pivotally attached to the housing of the food processing system 10 shown in FIG. 1. The movement of the ends 48 of the actuator arms in direction 50 causes the attached driven system 24 to also move in direction 50. The movement of the attached driven system 24 in direction 50 causes the attached cutting member 15 to also move in direction 50. When the cutting member 15 is in the extended position, the cutting member 15 is disposed further away from the belt 36 than when the cutting member 15 is in the retracted position. When the cutting member 15 is in the extended position, the cutting member 15 is in position to slice food product.

When the actuator shaft 38 moves the cutting member 15 into the retracted position, the actuator shaft 38 moves in direction 50, thereby causing attached ends 46 of the attached actuator arms 40 to also move in direction 50. This causes ends 48 of the actuator arms 40 to move in direction 44 as a result of the actuator arms 40 pivoting at pivot point 52 which is pivotally attached to the housing of the food processing system 10 shown in FIG. 1. The movement of the ends 48 of the actuator arms in direction 44 causes the attached driven system 24 to also move in direction 44. The movement of the attached driven system 24 in direction 44 causes the attached cutting member 15 to also move in direction 44. When the cutting member 15 is in the retracted position, the cutting member 15 no longer cuts the food product. As a result, the actuator system 28 is used to selectively cut food product by moving the cutting member 15 between the extended and retracted positions. In other embodiments, the actuator system 28 may vary.

Figure 5:
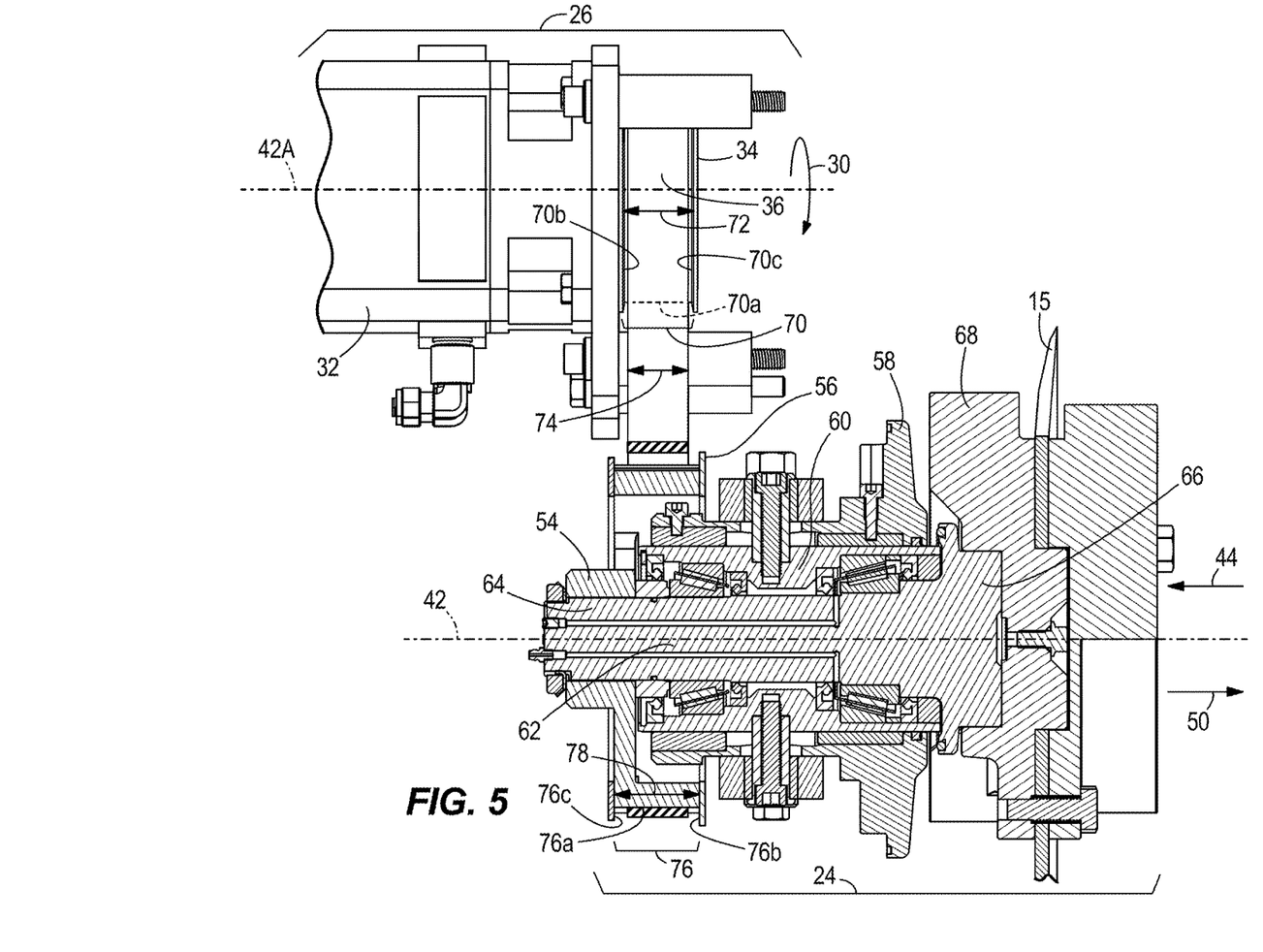
FIG. 5 illustrates a side view of a driving system, the driven system, and a cutting member of the embodiment of FIG. 4 with an interior of the driven system being exposed.

FIG. 5 illustrates a side view of the driving system 26, driven system 24, and cutting member 15 of the embodiment of FIG. 4 with an interior of the driven system 24 being exposed. As shown, the driven system 24 comprises a driven pulley hub 54, a driven pulley 56, a main housing 58, a spindle housing 60, and a spindle 62. The driven pulley hub 54 is fixedly attached to an end 64 of the spindle 62 and to the driven pulley 56. The other end 66 of the spindle 62 is fixedly attached to the cutting member 15. In other embodiments, the driven system 24 may vary. Counter weights 68 are fixedly attached to the cutting member 15. When the motor 32 of the driving system 26 rotates the driving pulley 34 in clockwise direction 30, which correspondingly rotates the belt 36 in clockwise direction 30, the belt 36 correspondingly rotates the driven pulley 56 in clockwise direction 30. When the driven pulley 56 is rotated in clockwise direction 30, the fixedly attached pulley hub 54 and the spindle 62 also rotate in clockwise direction 30 with the spindle 62 rotating relative to and within the spindle housing 60. The spindle housing 60 is fixedly attached to the main housing 58. As a result, the spindle 62 rotates in clockwise direction 30 relative to both the spindle housing 60 and the main housing 58. Rotation of the spindle 62 in clockwise direction 30 causes the fixedly attached cutting member 15 and counter weights 68 to also rotate in clockwise direction 30. In such manner, the driving system 26 can selectively cause the cutting member 15 to rotate in clockwise direction 30 to cut food product.

The driving pulley 34 comprises a driving pulley pocket 70 which the belt 36 is disposed against. As shown in FIGS. 4-5, the driving pulley belt pocket 70 comprises first, second, and third driving pulley belt pocket surfaces 70a, 70b, and 70c. The second and third driving pulley belt pocket surfaces 70b and 70c are opposed to one another and extend in a traverse orientation from separate ends of the first driving pulley belt pocket surface 70a. The belt 36 is disposed on the first driving pulley belt pocket surface 70a between the second and third driving pulley belt pocket surfaces 70b and 70c. A width 72 of the first driving pulley belt pocket surface 70a of the driving pulley pocket 70 is larger than a width 74 of the belt 36 to allow relative movement of the first driving pulley belt pocket surface 70a of the driving pulley 34 along axis 42A relative to the belt 36 as the actuator system 28 (discussed collectively in FIGS. 2-4) selectively moves the driven system 24 and the connected cutting member 15 between the extended and retracted positions. In such manner, the belt 36 is allowed to walk back and forth along axis 42A relative to and along the width 72 of the first driving pulley belt pocket surface 70a of the driving pulley 34 during extension and retraction of the cutting member 15 to allow the longitudinal position of the cutting member 15 to be changed without damaging the belt 36. The width 72 of the first driving pulley belt pocket surface 70a of the driving pulley pocket 70 is at least 1.3 times larger than the width 74 of the belt 36. In another embodiment, the width 72 of the first driving pulley belt pocket surface 70a of the driving pulley pocket 70 is at least 2 times larger than the width 74 of the belt 36. In still other embodiments, the width 72 of the first driving pulley belt pocket surface 70a of the driving pulley pocket 70 may vary as to how much larger it is than the width 74 of the belt 36.

Similarly, the driven pulley 56 comprises a driven pulley pocket 76 which the belt 36 is disposed against. As shown in FIGS. 4-5, the driven pulley belt pocket 76 comprises first, second, and third driven pulley belt pocket surfaces 76a, 76b, and 76c. The second and third driven pulley belt pocket surfaces 76b and 76c are opposed to one another and extend in a traverse orientation from separate ends of the first driven pulley belt pocket surface 76a. The belt 36 is disposed on the first driven pulley belt pocket surface 76a between the second and third driven pulley belt pocket surfaces 76b and 76c. A width 78 of the first driven pulley belt pocket surface 76a of the driven pulley pocket 76 is larger than the width 74 of the belt 36 to allow relative movement of the first driven pulley belt pocket surface 76a of the driven pulley 56 along axis 42 relative to the belt 36 as the actuator system 28 (discussed collectively in FIGS. 2-4) selectively moves the driven system 24 and the connected cutting member 15 between the extended and retracted positions. In such manner, the belt 36 is allowed to walk back and forth along axis 42 relative to and along the width 74 of the first driven pulley belt pocket surface 76a of the driven pulley 56 during extension and retraction of the cutting member 15 to allow the longitudinal position of the cutting member 15 to be changed without damaging the belt 36. The width 78 of the first driven pulley belt pocket surface 76a of the driven pulley pocket 76 is at least 1.2 times larger than the width 74 of the belt 36 to allow relative movement between the belt 36 and the first driven pulley belt pocket surface 76a of the driven pulley pocket 76 to avoid damage to the belt. This multiplier of at least 1.2 has been found to be a critical dimension with unexpected results due to the reduction and/or complete elimination of belt damage occurring at this critical dimension. In another embodiment, the width 78 of the first driven pulley belt pocket surface 76a of the driven pulley pocket 76 is at least 2 times larger than the width 74 of the belt 36. In still other embodiments, the width 78 of the first driven pulley belt pocket surface 76a of the driven pulley pocket 76 may vary as to how much larger it is than the width 74 of the belt 36.

Figure 6:
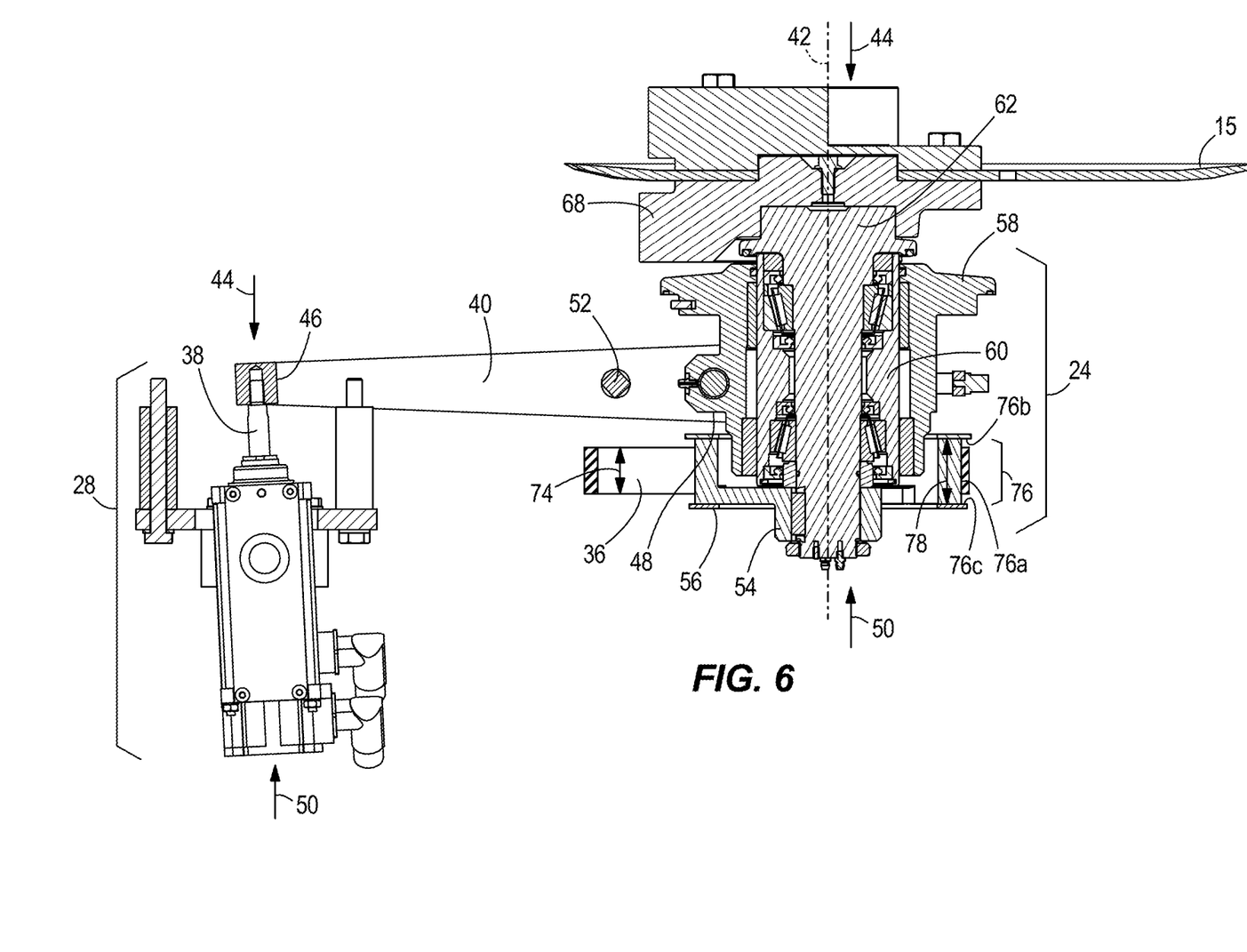
FIG. 6 illustrates a side view of an actuator system, the driven system, and the cutting member of the embodiment of FIG. 4 with an interior of the driven system being exposed.
Figure 7:
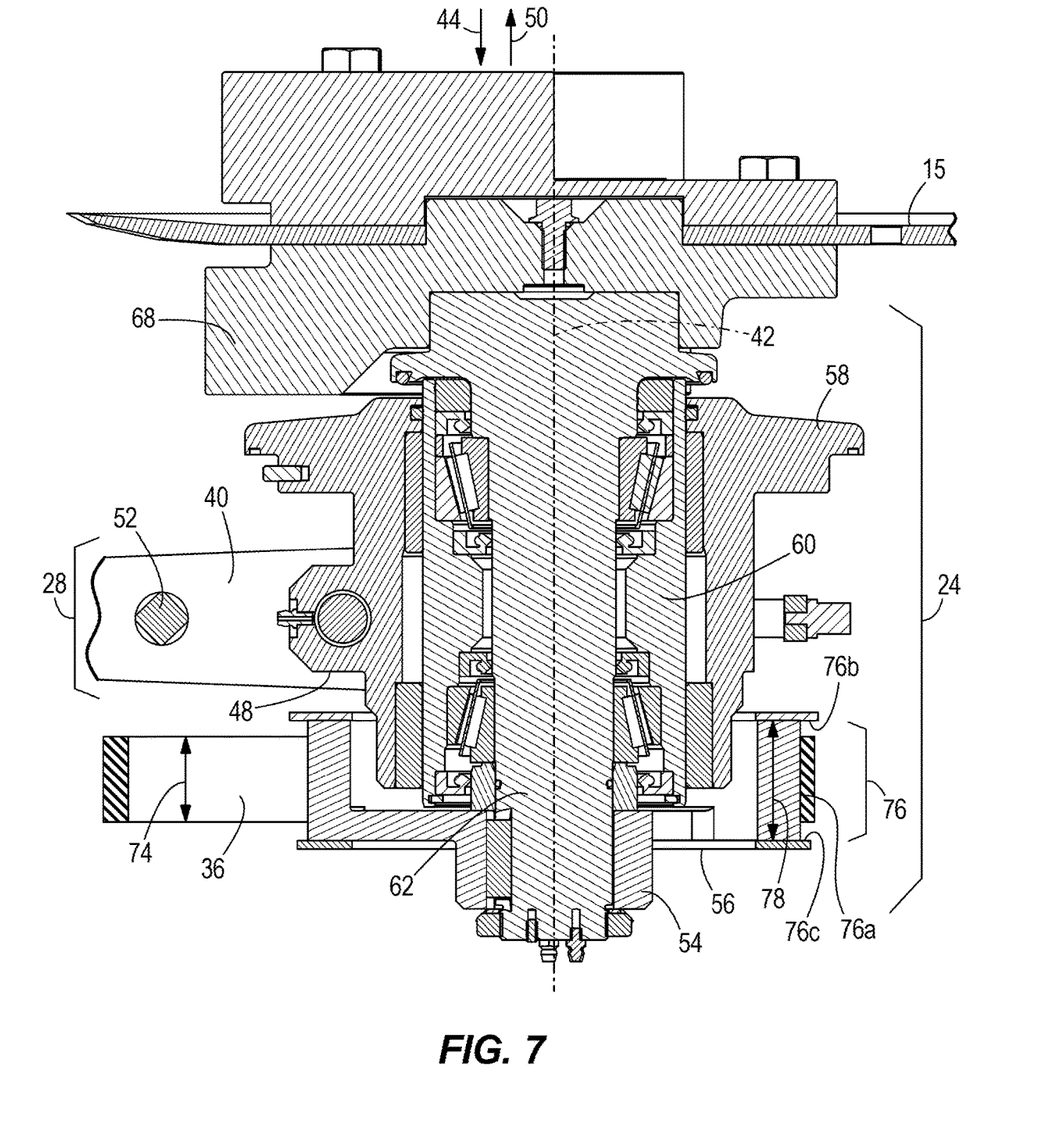
FIG. 7 illustrates a close-up view of the interior of the driven system of the embodiment of FIG. 6.

FIG. 6 illustrates a side view of the actuator system 28, driven system 24, and cutting member 15 of the embodiment of FIG. 4 with an interior of the driven system 24 being exposed. FIG. 7 illustrates a close-up view of the interior of the driven system 24 of the embodiment of FIG. 6. As shown in FIGS. 6 and 7 collectively, the actuator system 28 selectively moves the driven system 24 and the connected cutting member 15 between extended and retracted positions along axis 42. As previously discussed, when the actuator shaft 38 moves the cutting member 15 in the extended position, the actuator shaft 38 moves in direction 44, thereby causing attached ends 46 of the attached actuator arms 40 to also move in direction 44. This causes ends 48 of the actuator arms 40 to move in direction 50 as a result of the actuator arms 40 pivoting at pivot point 52 which is pivotally attached to the housing of the food processing system 10 shown in FIG. 1.

Ends 48 of the actuator arms 40 are attached to the main housing 58. The movement of the ends 48 of the actuator arms in direction 50 causes the attached main housing 58 to also move in direction 50. Movement of the main housing 58 in direction 50 causes the attached spindle housing 60, driven pulley hub 54, driven pulley 56, spindle 62, cutting member 15, and counter weights 68 to also move in direction 50. Due to the width 78 of the first driven pulley belt pocket surface 76a of the driven pulley pocket 76 being larger than the width 74 of the belt 36, the belt 36 is allowed to walk relative to the first driven pulley belt pocket surface 76a of the driven pulley 56 along axis 42 during the extension of the cutting member 15 in direction 50 to allow the longitudinal position of the cutting member 15 to be changed without damaging the belt 36. Similarly, as shown in FIG. 5, due to the width 72 of the first driving pulley belt pocket surface 70a of the driving pulley pocket 70 being larger than the width 74 of the belt 36, the belt 36 is allowed to walk relative to the first driving pulley belt pocket surface 70a of the driving pulley 34 along axis 42A during the extension of the cutting member 15 in direction 50 to allow the longitudinal position of the cutting member 15 to be changed without damaging the belt 36. When the cutting member 15 is in the extended position, the cutting member 15 is disposed further away from the belt 36 than when the cutting member 15 is in the retracted position. When the cutting member 15 is in the extended position, the cutting member 15 is in position to slice food product.

As previously discussed, as shown in FIGS. 6 and 7 collectively, when the actuator shaft 38 moves the cutting member 15 into the retracted position, the actuator shaft 38 moves in direction 50, thereby causing attached ends 46 of the attached actuator arms 40 to also move in direction 50. This causes ends 48 of the actuator arms 40 to move in direction 44 as a result of the actuator arms 40 pivoting at pivot point 52 which is pivotally attached to the housing of the food processing system 10 shown in FIG. 1. The movement of the ends 48 of the actuator arms in direction 44 causes the attached main housing 58 to also move in direction 44. Movement of the main housing 58 in direction 44 causes the attached spindle housing 60, driven pulley hub 54, driven pulley 56, spindle 62, cutting member 15, and counter weights 68 to also move in direction 44.

Due to the width 78 of the first driven pulley belt pocket surface 76a of the driven pulley pocket 76 being larger than the width 74 of the belt 36, the belt 36 is allowed to walk relative to the first driven pulley belt pocket surface 76a of the driven pulley 56 along axis 42 during the retraction of the cutting member 15 in direction 44 to allow the longitudinal position of the cutting member 15 to be changed without damaging the belt 36. Similarly, as illustrated in FIG. 5, due to the width 72 of the first driving pulley belt pocket surface 70a of the driving pulley pocket 70 being larger than the width 74 of the belt 36, the belt 36 is allowed to walk relative to the first driving pulley belt pocket surface 70a of the driving pulley 34 along axis 42A during the retraction of the cutting member 15 in direction 44 to allow the longitudinal position of the cutting member 15 to be changed without damaging the belt 36. When the cutting member 15 is in the retracted position, the cutting member 15 no longer cuts the food product. As a result, the actuator system 28 shown in FIGS. 6-7 is used to selectively cut food product by moving the cutting member 15 between the extended and retracted positions.

Figure 8:
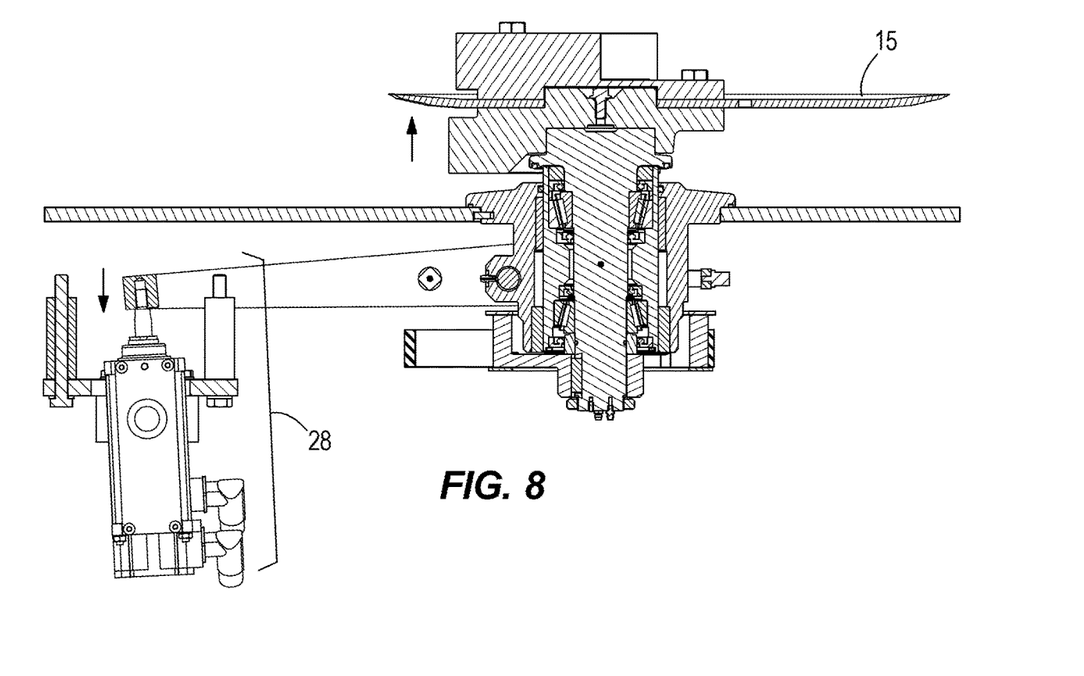
FIG. 8 illustrates the side view of the embodiment of FIG. 6 with the cutting member having been moved into an extended position by the actuator system.
Figure 9:
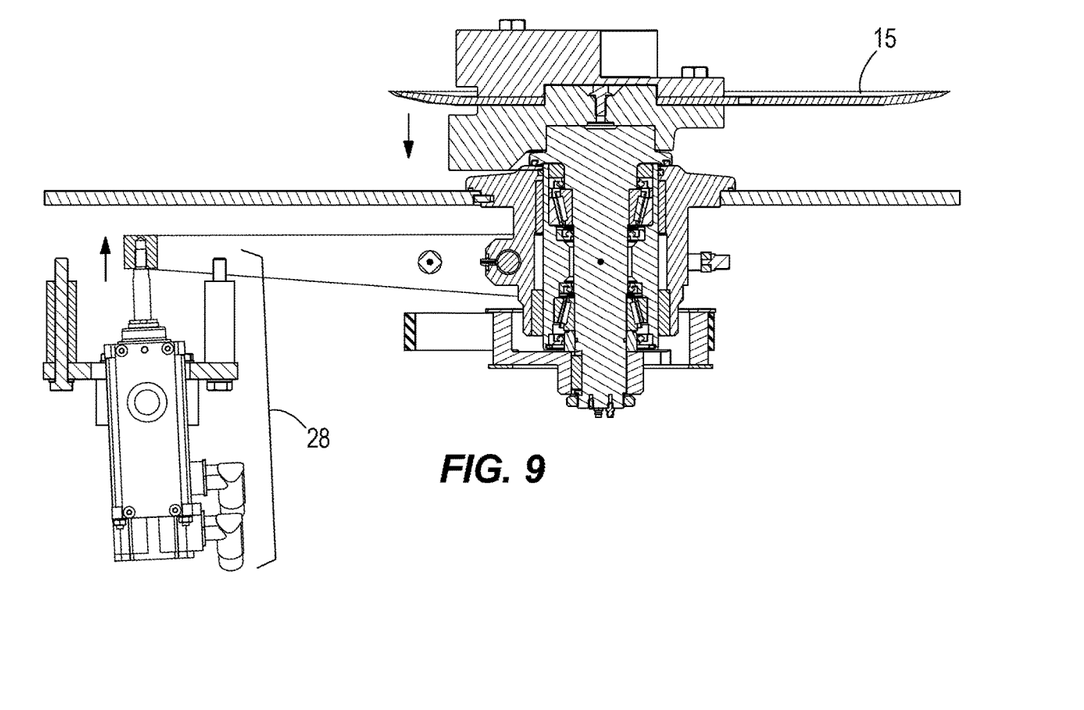
FIG. 9 illustrates the side view of the embodiment of FIG. 6 with the cutting member having been moved into a retracted position by the actuator system.

FIG. 8 illustrates the side view of the embodiment of FIG. 6 with the cutting member 15 having been moved into the extended position by the actuator system 28. FIG. 9 illustrates the side view of the embodiment of FIG. 6 with the cutting member 15 having been moved into the retracted position by the actuator system 28.

In other embodiments, one or more components of the food processing system 10 of FIGS. 1-9 may vary in type, number, function, configuration, orientation, or in one or more other respects. In still other embodiments, one or more additional components may be added to the food processing system 10 of FIGS. 1-9.

Figure 10:
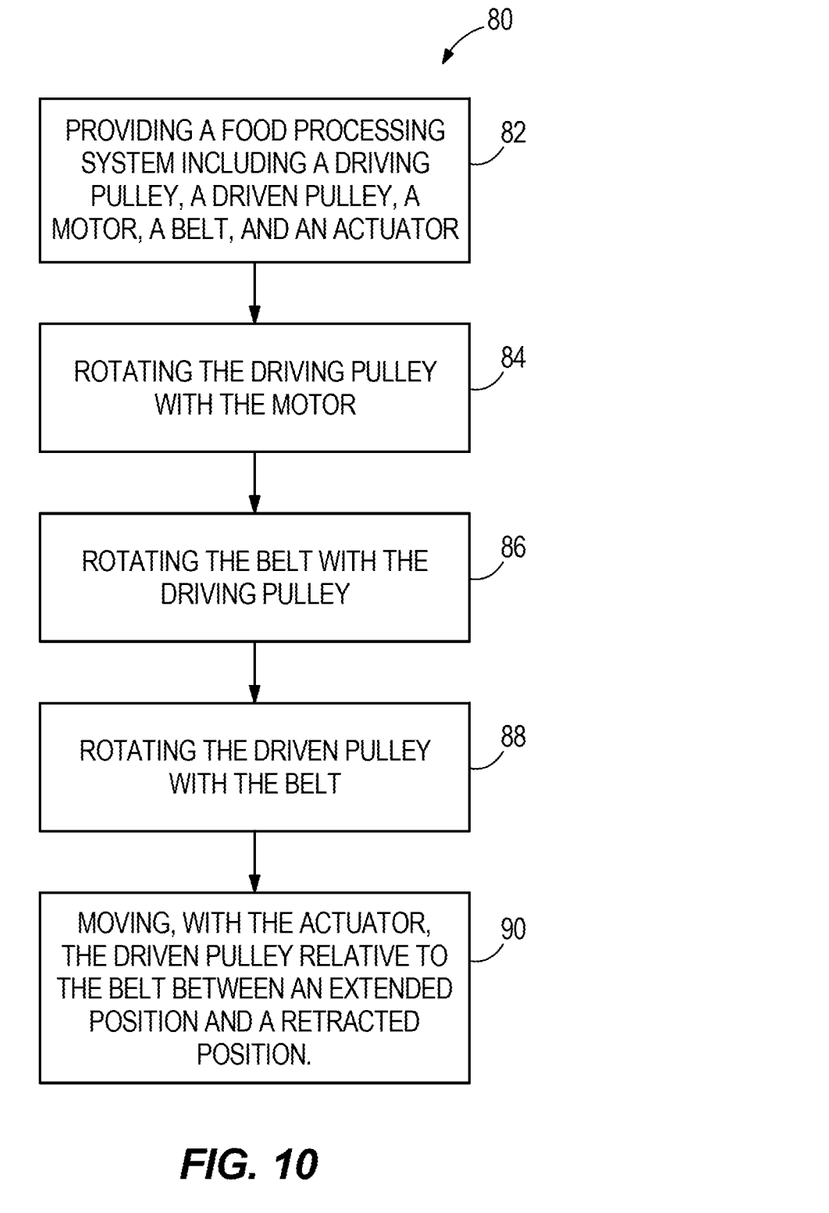
FIG. 10 illustrates a flowchart showing one embodiment of a method for moving one or more components of a food processing system.

FIG. 10 illustrates a flowchart showing one embodiment of a method 80 for moving one or more components of a food processing system. The method 80 may utilize any of the food processing systems or machines disclosed herein. In other embodiments, the method 80 may utilize varying food processing systems or machines. In step 82, a food processing system is provided. The food processing system includes a driving pulley, a driven pulley, a motor, a belt, and an actuator. In step 84, the motor rotates the driving pulley. In step 86, the driving pulley rotates the belt. In step 88, the belt rotates the driven pulley. In step 90, the actuator moves the driven pulley relative to the belt between an extended position and a retracted position.

In another embodiment the provided food processing system may further comprise a food processing device connected with the driven pulley with the food processing device being disposed further away from the belt in the extended position than in the retracted position. The food processing device may comprise a cutting member. The driven pulley may comprise a driven pulley belt pocket which the belt is disposed against. The driven pulley belt pocket may comprise first, second, and third driven pulley belt pocket surfaces. The second and third driven pulley belt pocket surfaces may be opposed to one another and extend in a traverse orientation from separate ends of the first driven pulley belt pocket surface. The belt may be disposed on the first driven pulley belt pocket surface between the second and third driven pulley belt pocket surfaces. A width of the first driven pulley belt pocket surface of the driven pulley belt pocket is at least 1.2 times larger than the width of the belt to allow relative movement between the belt and the first driven pulley belt pocket surface of the driven pulley when the driven pulley moves between the extended and the retracted position. The driving pulley may comprise a driving pulley belt pocket which the belt is disposed against. The driving pulley belt pocket may comprise first, second, and third driving pulley belt pocket surfaces. The second and third driving pulley belt pocket surfaces may be opposed to one another and extend in a traverse orientation from separate ends of the first driving pulley belt pocket surface. The belt may be disposed on the first driving pulley belt pocket surface between the second and third driving pulley belt pocket surfaces. A width of the first driving pulley belt pocket surface of the driving pulley belt pocket is at least 1.3 times larger than the width of the belt to allow relative movement between the belt and the first driving pulley belt pocket surface of the driving pulley when the driving pulley moves between the extended and the retracted position. This multiplier of at least 1.3 has been found to be a critical dimension with unexpected results due to the reduction and/or complete elimination of belt damage occurring at this critical dimension. The actuator may comprise at least one arm which is connected with the driven pulley. The driven pulley may comprise a housing and a spindle rotatably disposed within the housing, with the at least one arm connected with the housing to move the housing and the spindle relative to the belt between the extended and the retracted positions.

In other embodiments, one or more steps of the method 80 may be modified in substance or in order, one or more steps of the method may not be followed, one or more additional steps may be added, or other modifications may be made.

One or more embodiments of the disclosure provide one or more advantages over one or more of the current food processing machines by providing food processing systems and methods of use which allow for food processing devices to be moved relative to food product while saving cost, increasing reliability, taking up less space, and/or providing one or more additional advantages.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A food processing system comprising:
    a driving pulley;
    a driven pulley;
    a motor to rotate the driving pulley;
    a belt connected with the driving pulley and the driven pulley, the driving pulley to rotate the belt, the belt to rotate the driven pulley; and
    an actuator connected with the driven pulley, the actuator to move the driven pulley relative to the belt between an extended position and a retracted position;
    wherein the driving pulley comprises a driving pulley belt pocket, the driving pulley belt pocket comprising first, second, and third driving pulley belt pocket surfaces, the second and third driving pulley belt pocket surfaces opposed to one another and extending in a traverse orientation from separate ends of the first driving pulley belt pocket surface, the belt disposed on the first driving pulley belt pocket surface between the second and third driving pulley belt pocket surfaces, a width of the first driving pulley belt pocket surface sized larger than a width of the belt to allow relative movement between the belt and the first driving pulley belt pocket surface when the driven pulley moves between the extended and retracted positions;
    wherein the driven pulley comprises a driven pulley belt pocket, the driven pulley belt pocket comprising first, second, and third driven pulley belt pocket surfaces, the second and third driven pulley belt pocket surfaces opposed to one another and extending in a traverse orientation from separate ends of the first driven pulley belt pocket surface, the belt disposed on the first driven pulley belt pocket surface between the second and third driven pulley belt pocket surfaces, a width of the first driven pulley belt pocket surface sized larger than a width of the belt to allow relative movement between the belt and the first driven pulley belt pocket surface when the driven pulley moves between the extended and retracted positions;
    wherein the belt is configured to walk back and forth relative to and along the width of the first driving pulley belt pocket surface and relative to and along the width of the first driven pulley belt pocket surface when the driven pulley is moved back and forth between the extended and retracted positions;
    wherein the actuator comprises at least one arm directly connected to a main housing, a spindle housing fixedly attached to the main housing, a spindle rotatably disposed within and relative to the spindle housing, the driven pulley fixedly attached to the spindle, the at least one arm configured to move the main housing, the spindle housing, and the spindle relative to the belt when the driven pulley moves between the extended and retracted positions.

2. The food processing system of claim 1 further comprising a food processing device connected with the spindle, wherein the food processing device is disposed further away from the belt when the driven pulley is in the extended position than when the driven pulley is in the retracted position.

3. The food processing system of claim 2 wherein the food processing device is a cutting member.

4. The food processing system of claim 1 wherein the width of the first driven pulley belt pocket surface is at least 1.2 times larger than the width of the belt to allow relative movement between the belt and the first driven pulley belt pocket surface when the driven pulley moves between the extended and retracted positions.

5. The food processing system of claim 1 wherein the width of the first driving pulley belt pocket surface is at least 1.3 times larger than the width of the belt to allow relative movement between the belt and the first driving pulley belt pocket surface when the driven pulley moves between the extended and retracted positions.

6. The food processing system of claim 1 wherein a first end of the at least one arm is directly connected to the main housing and a second end of the at least one arm is directly connected to the actuator.

7. The food processing system of claim 6 further comprising a housing of the food processing system, wherein the at least one arm is attached to the housing of the food processing system at a pivot point between the first and the second ends about which the at least one arm pivots as the driven pulley moves between the extended and retracted positions.

8. The food processing system of claim 1 wherein the second and third driving pulley belt pocket surfaces have respective diameters which are larger than a diameter of the first driving pulley belt pocket surface, and the second and third driven pulley belt pocket surfaces have respective diameters which are larger than a diameter of the first driven pulley belt pocket surface.

9. A food processing system comprising:
a driving pulley;
a driven pulley;
a food processing device connected with the driven pulley;
a motor to rotate the driving pulley;
a belt connected with the driving pulley and the driven pulley, the driving pulley to rotate the belt, the belt to rotate the driven pulley and the food processing device connected with the driven pulley; and
an actuator connected with the driven pulley and the food processing device, the actuator to move the driven pulley and the food processing device connected with the driven pulley relative to the belt when the driven pulley is moved between an extended position and a retracted position, wherein the food processing device is disposed further away from the belt when the driven pulley is in the extended position than when the driven pulley is in the retracted position;
wherein the driving pulley comprises a driving pulley belt pocket, the driving pulley belt pocket comprising first, second, and third driving pulley belt pocket surfaces, the second and third driving pulley belt pocket surfaces opposed to one another and extending in a traverse orientation from separate ends of the first driving pulley belt pocket surface, the belt disposed on the first driving pulley belt pocket surface between the second and third driving pulley belt pocket surfaces, a width of the first driving pulley belt pocket surface sized larger than a width of the belt to allow relative movement between the belt and the first driving pulley belt pocket surface when the driven pulley moves between the extended and retracted positions;
wherein the driven pulley comprises a driven pulley belt pocket, the driven pulley belt pocket comprising first, second, and third driven pulley belt pocket surfaces, the second and third driven pulley belt pocket surfaces opposed to one another and extending in a traverse orientation from separate ends of the first driven pulley belt pocket surface, the belt disposed on the first driven pulley belt pocket surface between the second and third driven pulley belt pocket surfaces, a width of the first driven pulley belt pocket surface sized larger than a width of the belt to allow relative movement between the belt and the first driven pulley belt pocket surface when the driven pulley moves between the extended and retracted positions;
wherein the belt is configured to walk back and forth relative to and along the width of the first driving pulley belt pocket surface and relative to and along the width of the first driven pulley belt pocket surface when the driven pulley is moved back and forth between the extended and retracted positions;
wherein the actuator comprises at least one arm directly connected to a main housing, a spindle housing fixedly attached to the main housing, a spindle rotatably disposed within and relative to the spindle housing, the driven pulley fixedly attached to the spindle, the at least one arm configured to move the main housing, the spindle housing, and the spindle relative to the belt when the driven pulley moves between the extended and retracted positions.

10. The food processing system of claim 9 wherein the food processing device is a cutting member.

11. The food processing system of claim 9 wherein the width of the first driven pulley belt pocket surface is at least 1.2 times larger than the width of the belt to allow relative movement between the belt and the first driven pulley belt pocket surface when the driven pulley moves between the extended and retracted positions.

12. The food processing system of claim 9 wherein the width of the first driving pulley belt pocket surface is at least 1.3 times larger than the width of the belt to allow relative movement between the belt and the first driving pulley belt pocket surface when the driven pulley moves between the extended and retracted positions.

13. The food processing system of claim 9 wherein a first end of the at least one arm is directly connected to the main housing and a second end of the at least one arm is directly connected to the actuator.

14. The food processing system of claim 13 further comprising a housing of the food processing system, wherein the at least one arm is attached to the housing of the food processing system at a pivot point between the first and the second ends about which the at least one arm pivots as the driven pulley moves between the extended and retracted positions.

15. The food processing system of claim 9 wherein the second and third driving pulley belt pocket surfaces have respective diameters which are larger than a diameter of the first driving pulley belt pocket surface, and the second and third driven pulley belt pocket surfaces have respective diameters which are larger than a diameter of the first driven pulley belt pocket surface.

* * * * *